No. 659,544. Patented Oct. 9, 1900.
F. D. PEARNE.
TELEGRAPH SYSTEM.
(Application filed Apr. 16, 1900.)
(No Model.)
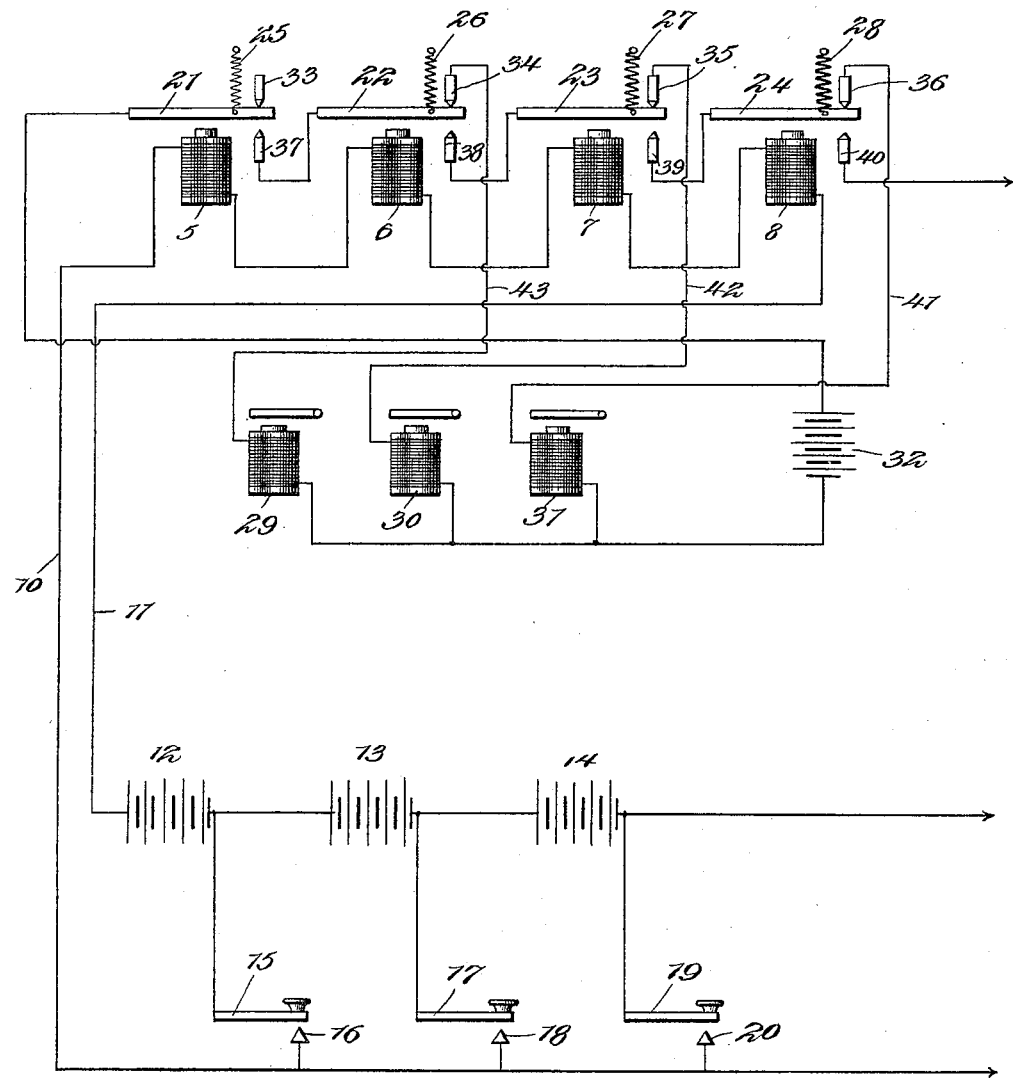
Witnesses
Howard D. Orr.
Geo. H. Chandler.
F. D. Pearne, Inventor.
by C. A. Snow & Co.
Attorneys
THE NORRIS PETERS CO., PHOTO-LITHO., WASHINGTON, D. C.

UNITED STATES PATENT OFFICE.

FRANK D. PEARNE, OF DAVENPORT, IOWA.

TELEGRAPH SYSTEM.

SPECIFICATION forming part of Letters Patent No. 659,544, dated October 9, 1900.

Application filed April 16, 1900. Serial No. 13,156. (No model.)

*To all whom it may concern:*

Be it known that I, FRANK D. PEARNE, a citizen of the United States, residing at Davenport, in the county of Scott, in the State of Iowa, have invented certain new and useful Improvements in Telegraph Systems; and I do hereby declare the following to be a full, clear, and exact description of the invention, such as will enable others skilled in the art to which it appertains to make and use the same.

This invention relates to telegraphy; and it has for its object to provide a system of relays, sounders, keys, and batteries wherein signals may be sent from each key to its respective sounder and without operating the remaining sounders, the signals from all of the keys being sent over the same wire with either a metallic or a ground return.

Further objects and advantages of the invention will be evident from the following description.

In the drawing forming a portion of this specification there is shown in diagram a system involving the present invention.

Referring now to the drawing, the system includes a series of relays 5, 6, 7, and 8, the windings of which are connected in series, as shown, and which relays are grounded or connected with a metallic return 10 at one end of the series, while at the other end of the series they are connected with the line-wire 11, and connected with the line-wire at the sending-station are a number of separate batteries 12, 13, and 14, each consisting of the requisite number of cells and which batteries are connected in series and are properly spaced with respect to each other.

At a point between the batteries 12 and 13 is connected a key 15, the contact-point 16 of which is grounded or connected with the metallic return, as shown, and at a point between the batteries 13 and 14 is connected a second key 17, having a contact 18 for engagement thereby and which is connected with the return. A third key 19 is connected with the battery 14 at the opposite side thereof from the battery 13 and has a contact-point 20 for engagement thereby and which is connected with the return. Thus if key 15 is depressed the battery 12 will be included in the circuit of the relays, if key 17 is depressed said circuit will be closed through batteries 12 and 13, and if key 19 is depressed the circuit will be closed through all three batteries. The batteries are preferably of the same energy, and hence there is a constant increase in the current delivered to the relays as the keys are successively depressed, each key representing a certain definite current intensity. The relays are all wound to substantially the same resistance, and with the same tensions of the retracting-springs thereof they would all respond, and to prevent this simultaneous response it is only necessary to vary the tensions of the retracting-springs to correspond to the corresponding current intensities represented by their respective keys.

In the drawing the relays 5, 6, 7, and 8 are shown as having armatures 21, 22, 23, and 24, respectively, which latter are provided with retracting-springs 25, 26, 27, and 28, respectively. The spring 25 is placed under such tension as to respond to the pull of the electromagnet 5 when energized from the current of the single battery 12, while spring 26 requires the energy of batteries 12 and 13 and spring 27 requires the energy of all three batteries to overcome its resistance. The relay 8 is operated only when an additional sounder is used and is shown complete in order to illustrate the location of its armature with respect to the remaining apparatus. Thus if the key 15 is depressed armature 21 will be drawn down, if key 17 is depressed armatures 21 and 22 will be drawn down, and if key 19 is depressed armatures 21, 22, and 23 will be drawn down. In other words, relay 5 responds to key 12, relay 6 responds to key 17, and relay 7 responds to key 19. The key 15 has a corresponding sounder 29, while keys 17 and 19 have corresponding sounders 30 and 31, respectively, these three sounders being connected mutually in multiple and in series with a battery 32. The armatures 21, 22, 23, and 24 lie normally, under the influence of their springs, against contact-points 33, 34, 35, and 36, respectively, the contact 36 being connected by wire 41 to the free terminal of the sounder 31, while contact-point 35 is connected by wire 42 with the free terminal of sounder 30, and contact-point 34 is connected by wire 43 with the free terminal of sounder 29. The contacts act merely as a stop. The terminal of battery 32, opposite to the connection with the sounders, is connected with the armature 21 of relay 8 by means of wire 44. When the armatures are drawn down by the magnets of the relays, the armatures 21, 22, 23, and 24 engage contacts 37, 38, 39, and 40, respectively, point 37 being connected with armature 22, contact 38 being connected with armature 23, and contact 39 being connected with armature 24. The contact 40 acts merely as a stop, excepting when additional apparatus is employed. With this construction it will be seen that when the key 15 is operated the current from battery 12 passes through the windings of all of the relays, but the armature 21 is the only one that responds and moves to engage the contact 37. Current from battery 32 then flows through wire 44 to armature 21, to point 37, to armature 22, to contact 34, to sounder 29, and back to battery, thus operating the sounder 29 and having no influence upon the remaining sounders. When key 17 is depressed, batteries 12 and 13 are both connected in series with the windings of the several relays, the relays 5 and 6 being energized with sufficient intensity to overcome the resistance of springs 25 and 26, and both armatures 21 and 22 will be drawn down. The circuit from battery 32 is then to armature 21, to contact 37, armature 22, contact 38, armature 23, contact 35, and sounder 30, and thence to battery 32. The armature 22 having moved from contact-point 34 the sounder 29 is cut out. When key 19 is depressed, the relay 7 is energized in the manner hereinbefore described and also relays 5 and 6, the armatures 21, 22, and 23 being drawn down. The circuit from battery 32 is then to armature 21, to point 37, to armature 22, to point 38, to armature 23, to point 39, to armature 24, to point 36, and thence through wire 41 to sounder 31 and battery. It will be thus seen that each key effects the operation of its corresponding sounder and no other, it being understood that any specific and suitable instruments may be used and that modifications may be made within the scope of the appended claims without departing from the spirit of the invention.

What is claimed is—

1. The combination with a series of sounders connected in multiple, of a series of relays for closing the circuits of their respective sounders and operable by currents of successively-greater intensities, a transmitting-circuit including the relays in series and means for supplying currents of different intensities thereto, and connections whereby when each relay is operated, the corresponding sounder of the preceding relay will be cut out of its operating-circuit.

2. The combination with a transmitting-circuit and means for developing therein currents of different intensities, of a plurality of relays in said circuit in series, each relay having a contact-point against which its armature rests when the relay is deënergized and a second contact-point against which the armature rests when the relay is energized, a local circuit including a battery, a series of sounders having their terminals connected in multiple with one terminal of the battery and having their opposite terminals connected with the contact-points of the relays against which the armatures normally lie, the first armature of the series of relays having connection with the second terminal of the local battery and the succeeding armatures having connection with the second contact-points of their preceding relays, the relays being responsive to currents of succeeding greater intensities.

3. The combination with a transmitting-circuit and means for developing therein currents of different values, of relays connected in series in said circuit and responsive to circuits of successively-greater values, said relays including each an armature and two contacts for engagement by the armature alternately when the relay is active and passive, a local circuit including all the armatures when in their active positions and excluding them when in their passive positions, sounders included in the local circuit and having means for connection with their corresponding armatures when the latter are in their passive positions, and connections between each armature and the preceding relay to include such armature in circuit with the armature of the preceding relay when the latter armature is in its active position.

FRANK D. PEARNE.

Witnesses:
L. J. SIMMONS,
R. L. HARRISON, Jr.